(12) United States Patent
Lu

(10) Patent No.: US 7,997,002 B2
(45) Date of Patent: Aug. 16, 2011

(54) DUAL CARBON NANOTUBES FOR CRITICAL DIMENSION METROLOGY ON HIGH ASPECT RATIO SEMICONDUCTOR WAFER PATTERNS

(75) Inventor: Wei Lu, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 434 days.

(21) Appl. No.: 11/933,619

(22) Filed: Nov. 1, 2007

(65) Prior Publication Data

US 2009/0113739 A1 May 7, 2009

(51) Int. Cl.
*G01B 5/14* (2006.01)
*D01F 9/12* (2006.01)

(52) U.S. Cl. .......................................................... 33/836
(58) Field of Classification Search .................... 33/836; 73/105; 250/306–307; 205/104, 118
See application file for complete search history.

(56) References Cited

U.S. PATENT DOCUMENTS

| | | | |
|---|---|---|---|
| 6,683,305 B1 | 1/2004 | Lu et al. | |
| 6,780,664 B1 | 8/2004 | Goruganthu et al. | |
| 6,881,955 B2 | 4/2005 | Lu et al. | |
| 6,887,365 B2* | 5/2005 | Naughton | 205/104 |
| 6,930,307 B2* | 8/2005 | Takazawa et al. | 73/105 |
| 6,985,377 B2 | 1/2006 | Rust | |
| 7,094,616 B2 | 8/2006 | Archie et al. | |
| 7,180,061 B2 | 2/2007 | Lu | |
| 7,214,303 B2* | 5/2007 | Naughton | 205/104 |
| 7,368,712 B2* | 5/2008 | Boye et al. | 73/105 |
| 7,462,270 B2* | 12/2008 | Naughton | 73/105 |
| 7,495,215 B2* | 2/2009 | Akinaga et al. | 250/306 |
| 2004/0173744 A1* | 9/2004 | Takazawa et al. | 250/307 |
| 2005/0211896 A1 | 9/2005 | Lu et al. | |
| 2009/0113739 A1* | 5/2009 | Lu | 33/836 |
| 2010/0003500 A1* | 1/2010 | Stevens | 428/323 |
| 2010/0005553 A1* | 1/2010 | Jin et al. | 850/58 |

OTHER PUBLICATIONS

J. Martinez et al.; "Length control and Sharpening of Atomic Force Microscope Carbon Nanotube Tips Assisted by an Electron Beam"; Journal; Nanotechnology 16 (2005); pp. 2493-2496.
T. Kawano et al.; "Selective Vapor-Liquid-Solid Epitaxial Growth of Micro-Si Probe Electrode Arrays with On-Chip MOSFETs on Si (111) Substrates"; Journal; IEEE Transactions of Electronic Devices, vol. 51, No. 3; Mar. 2004; pp. 415-420.

* cited by examiner

*Primary Examiner* — Yaritza Guadalupe-McCall
(74) *Attorney, Agent, or Firm* — Whitman, Curtis, Christofferson & Cook, P.C.

(57) ABSTRACT

A probe capable of measuring recesses in features such as apertures and/or trench-like structures of very small size is comprised of one or more carbon nanotubes (CNTs) which is oriented at an angle and, if two or more CNTs are employed, such that they cross (with or without touching each other) at a location separated from ends of the carbon nanotubes which approximates the depth of the aperture or trench-like structure and at an angle such that the ends of the carbon nanotubes extends by a lateral distance greater than a dimension of a recess of a feature to be measured or in excess of a sidewall angle or an angle of a crystal lattice of a material in which a feature to be measured is formed.

14 Claims, 4 Drawing Sheets

Can't measure the recessed edge

DUAL CARBON NANOTUBES FOR CRITICAL DIMENSION METROLOGY ON HIGH ASPECT RATIO SEMICONDUCTOR WAFER PATTERNS

BACKGROUND OF THE INVENTION

1. Field of the Invention

The present invention generally relates to metrology apparatus for measuring features of surfaces and, more particularly, to features formed on or in a semiconductor wafer during semiconductor device or integrated circuit manufacture.

2. Description of the Prior Art

Issues of performance, functionality, cost and manufacturing yield have driven the development of higher densities of integration of semiconductor electronic devices and smaller minimum feature size regimes. At the same time, more complex structures for electronic elements therein have been developed to maintain adequate electrical characteristics and, in many cases, improve performance. Much the same requirements are necessary in other types of devices, as well, such as so-called micro-machines or nano-machines. Under such stringent requirements, it is imperative to confirm that at least critical dimensions of structures formed by various manufacturing processes conform to sophisticated designs and specifications using measurements of extremely high dimensional accuracy.

Numerous methods have been developed for inspecting the results of processes for forming very small structures which cannot be resolved by optical microscopy. For example, various techniques of scanning electron microscopy have been an industry standard in semiconductor manufacture for many years. Unfortunately, such techniques for observation of many structures are inherently destructive, particularly as applied to delicate electronic structures, and thus cannot confirm proper formation of structures at intermediate points in manufacture of a device which will eventually become operable.

Non-destructive testing or measurement of dimensions which cannot be resolved using optical microscopy generally requires probing of the structure and detection of contact of the probe and a structure surface. Such a technique is known as atomic force microscopy (AFM) in which a force imposed on the probe through contact with a surface of interest causes a change in the frequency of a vibration propagated through the probe. However, measurement of a trench-like or recessed structure or aperture requires use of a probe of smaller dimensions than the feature of interest. Probes of such small dimensions (e.g. less than 100 nm transverse dimension) have been developed and are currently in use although probes developed to date are difficult to fabricate and have dimensions and forms which limit the types of structures which can be measured.

For example, one known probe tip is shown in FIGS. 1A and 1B which show profiles of such a probe derived through scanning electron microscopy. As illustrated, this probe has a relatively low aspect ratio (less than 3:1) and slightly varying transverse dimensions (all slightly less than 100 nm) over its length and is thus generally slightly frustro-conical in shape or slightly barrel-shaped (e.g. the transverse dimension at a mid-point of the probe length being slightly larger than at the tip); forming a slightly boot-shaped overall cross-section) which is useful for measurement of slight recesses in trench-like structures (e.g. where the bottom of the trench may be slightly larger than at the top or surface from which the trench-like structure is formed) such as trenches, nested lines, nested spaces, contacts, line ends, space ends and the like which are relatively common in some semiconductor devices but may represent defects in other structures (e.g. where an etchant undercuts a resist). It can be readily appreciated, however, that a recess is a critical dimension but where measurement may be difficult. For example, in the probe illustrated in FIGS. 1A and 1B, the maximum recess which could be measured would be limited to about 5-6 nm and then only at a partial depth of the structure but not at the bottom thereof. Further, material strength limits the degree to which the probe width can be reduced and such probes will not be usable in foreseeable minimum feature size regimes. The possibility of developing relatively wider probe tips on narrower probe structures similar to that shown in FIG. 1C is currently projected to be about nine months behind current semiconductor manufacturing industry needs for current device designs.

SUMMARY OF THE INVENTION

It is therefore an object of the present invention to provide a probe capable of non-destructively measuring a recess in a trench-like structure at the bottom thereof.

In order to accomplish these and other objects of the invention, a probe is provided for performing measurements within trench-like structures comprising at least one carbon nanotubes arranged at an angle corresponding to an angle of said recess of said trench-like structure.

In accordance with another aspect of the invention, a method of performing measurements of a recess within trench-like structures with a probe comprising at least one carbon nanotube arranged at an angle corresponding to an angle of a recess of said trench-like structure, said method comprising steps of manipulating the probe into the trench-like structure, and scanning the probe until the carbon nanotube contacts the recess.

In accordance with a further aspect of the invention, a method of making a probe for measuring a recess within a trench-like structure comprising steps of positioning a carbon nanotube adjacent to a probe base at a desired angle, welding the carbon nanotube and the probe base together using a focused ion beam or electron beam, and cutting the carbon nanotube to a desired length at a desired distance from the probe base.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1A:
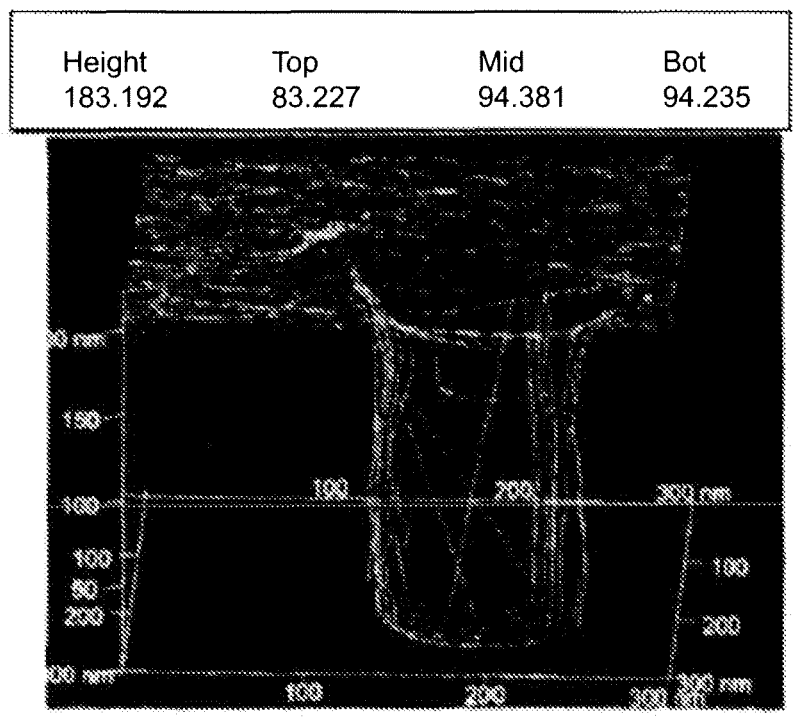
FIGS. 1A and 1B illustrate a known probe for measuring critical dimensions in a trench-like structure including small recesses.
Figure 1B:
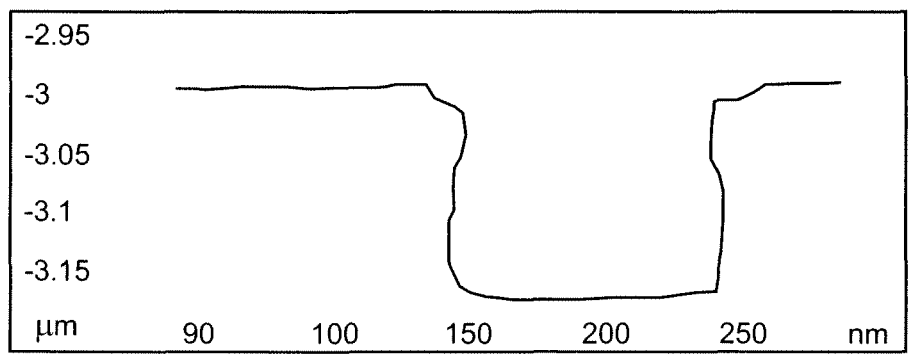
Figure 1C:
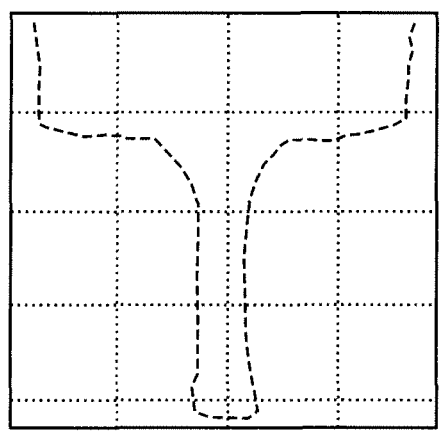
FIG. 1C illustrates a profile of a probe of the type illustrated in FIGS. 1A and 1B but of more optimal proportions than is readily available at the present time.
Figure 2A:
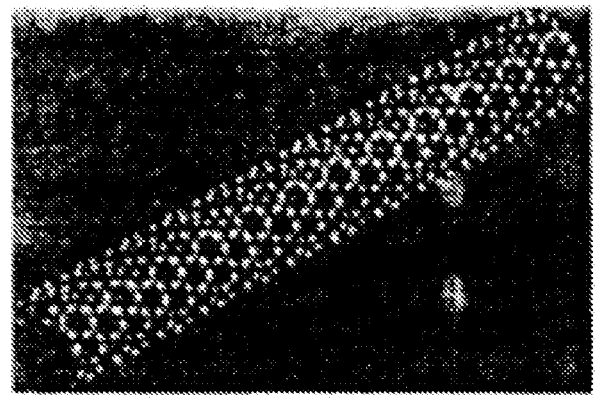
FIGS. 2A and 2B illustrate the crystal structure and use of a carbon nanotube (CNT) probe, respectively, FIG. 3 illustrate use of two carbon nanotubes to form a probe in accordance with the invention and capable of non-destructive measurement of a recess of substantially arbitrary dimensions in a trench-like structure.
Figure 2B:
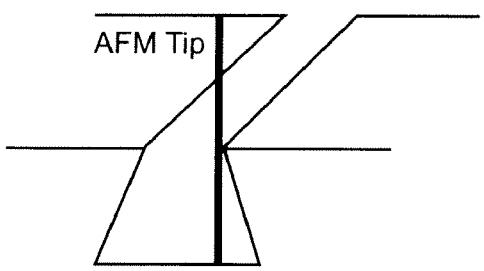

Referring now to the drawings, and more particularly to FIGS. 2A and 2B, there is shown a possible crystal structure of a carbon nanotube (CNT) and the use of a CNT as an atomic force microscopy probe. Since FIG. 2A is a theoretical crystal structure and FIG. 2B principally illustrates why a CNT probe, by itself, is not a solution for the limitations of probes such as those of FIGS. 1A-1C discussed above, neither Figure is admitted to be prior art as to the present invention.

Carbon nanotubes (CNTs) have been developed and are commercially available at the present time in at least small quantities. Carbon nanotubes are much stronger and of higher aspect ratio and much smaller diameter (e.g. 10 nm diameter and 500 nm length) and can measure much smaller spaces than the probes illustrated in FIGS. 1A-1C. Formation, length control, mounting for use as a probe and sharpening of a tip of a carbon nanotube for use as a probe in atomic force microscopy is disclosed in "Length Control and Sharpening of Atomic Force Microscope Nanotube Tips Assisted by an Electron Beam" by J. Martinez et al., Institute of Physics Publishing, Nanotechnology 16 (2005) 2493-2496 which is hereby fully incorporated by reference. CNT probes are believed to derive these properties through a crystal structure which is believed to be as illustrated in FIG. 2A. However, such a crystal structure causes a CNT to be inherently straight or cylindrical and prevents the possibility of forming a boot shape as in the probes of FIGS. 1A-1C. Therefore, while a CNT probe can be applied to narrower structures of higher aspect ratios than known probes, it is even less suited to measurement of recesses in trench-like structures as illustrated in FIG. 2B.

More specifically, it should be appreciated that when a recess is formed in a trench-like structure, whether by design or unintentionally, the angle of the sides of the trench-like structure may, depending on process parameters and reactants/etchants, follow the grain of the material in which the trench-like structure is formed and, if other than perpendicular to the surface from which the trench-like structure is formed, is likely to be at a substantial angle; resulting in the bottom of the trench-like structure being significantly wider than the top. It should also be appreciated, particularly in regard to semiconductor electronic devices, that sharp angles at boundaries of structures may tend to cause alteration of distribution of charge in the presence of an electrical field. Further, while the top of the trench-like structure may be accurately defined by a mask which may be designed to maintain critical dimensions such as the separation of structures on a chip, the process is less well controlled within the material below the mask. Therefore, it is extremely important to be able to accurately measure not only the dimensions of a trench-like structure but also the location of the extremities thereof which are most likely to be at the bottom corners of the recess. Accurate measurement at such locations clearly cannot be done with any of the probes of FIGS. 1A-1C which cannot reach such a corner or accommodate any recess greater than a few nanometers and which will be virtually unusable in connection with integrated circuit devices having foreseeable minimum feature sizes below about 100 nm or trench depths greater than about 300 nm.

In much the same manner and for much the same reasons, a CNT cannot reach such locations even though it may be of much smaller diameter/transverse dimension and much greater length than other known types of probes and is, in any event, less able to be developed in a form having a boot-shaped tip in order to accommodate any recess at all. Rather, as shown in FIG. 2B, while a CNT probe can be used in a trench-like structure having smaller transverse dimensions than the probe of FIGS. 1A-1C and can reach a much greater depth, scanning movement of the CNT is limited by the dimensions of the top of the trench-like structure and the CNT cannot be probed into any recess at all. Moreover, the direction in which the CNT extends cannot be well-controlled at the present state of the art.

Figure 3:
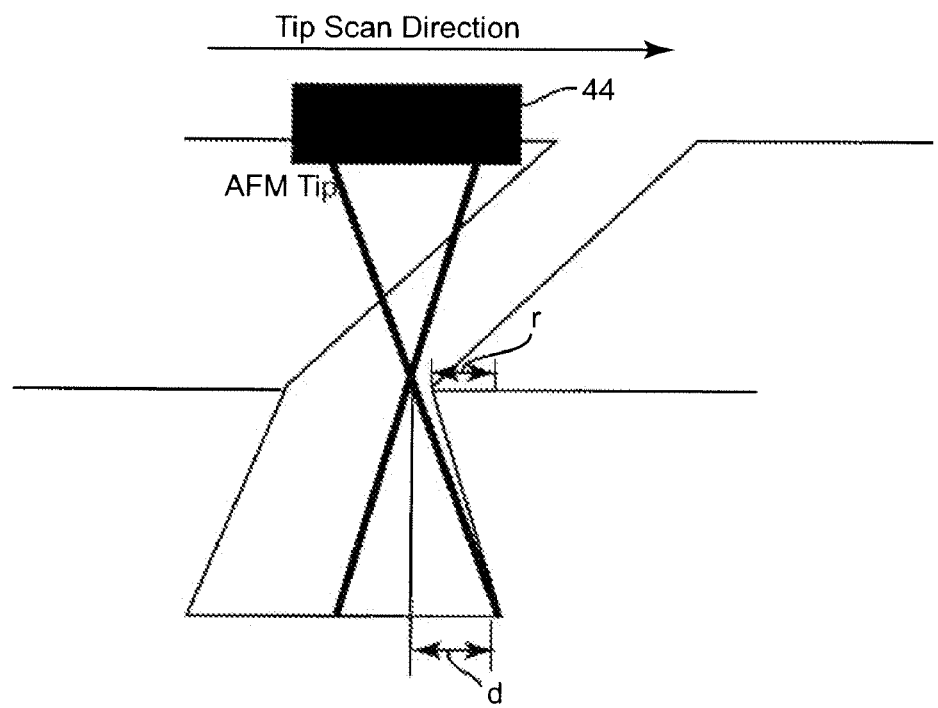

To solve these problems, the probe in accordance with the invention provides an angled CNT probe or, preferably two carbon nanotubes (CNTs) mounted (singly or together, as will be described in greater detail below) in a crossing or "X"-shaped arrangement and contacting or slightly separated from each other, as shown in FIG. 3. The crossing or mounting angle may be arbitrarily varied and should be slightly greater than the wall angle of the recess in the trench-like structure to be measured, as is also illustrated in FIG. 3 such that a CNT tip or end should extend by a lateral distance, d, from the crossing which exceeds an anticipated dimension, r, of a recess of a feature to be measured or such that the angle of a CNT (which need not be the same as the angle of another CNT) exceeds an angle of the side of the recess. CNT angles from only a few degrees (e.g. for metrology of trenches having substantially vertical walls) to in excess of 45° or more may be provided for various trench shapes.

The crossing height of the CNT probes (if two or more CNT probes are used) should approximate the nominal depth of the trench-like structure in order assure that one of the CNTs is able to reach the bottom corner of the recess while avoiding contact with the top of the trench by the side of either CNT of the probe such that the probe has a minimum spacing, if any, between probes at the approximate top of the trench while having a maximum spacing (e.g. 2 d if the probe angles are equal), as shown, although other crossing heights may be advantageous in particular applications. In general, the crossing location height from the probe tip(s) should be greater than one-half of the trench depth to assure that the probe width at the bottom of the trench is greater than the probe width at the top of the trench to assure that the width of the top of the trench does not interfere with probing into recesses.

The dimensions of the recess can then be measured by scanning the probe in a direction substantially parallel to a plane parallel to both of the CNTs although other scanning directions relative to the probe may be useful (e.g. to more accurately measure an angle of a trench wall or a recessed corner at an end of a trench). Thus the probe in accordance with the invention avoids the limitations of a single, nominally vertical CNT probe as well as those of the probes illustrated in FIGS. 1A-1C.

While the geometry of the crossing layout of the two CNTs in accordance with the invention is not at all critical to its operation and use as described above, the geometry should be chosen in accordance with the anticipated depth, top width and recess dimensions and wall angles to be measured. For example, to measure trench-like structures of principal interest at the present time, the tip gap at the bottom of the probe should be about 10-30 nm (corresponding to a recess dimension, r, of up to 5-15 nm) and about 0 nm (e.g. touching) to 10 nm (approximately the diameter of a CNT) at the crossing point near the mid-point of the respective CNTs preferably set at about 200 nm above the CNT tips or the nominal trench depth as noted above. The angle of the CNTs should slightly exceed the anticipated wall angle of the recess (which may be estimated from grain orientation of the material in which the trench is formed, as alluded to above. These parameters result in a shape similar to a twisted ladder below the crossing point (e.g. having a greater separation at the bottom than at the top and with the direction of separation of the CNTs rotating by slightly less than 90° between the crossing point and the bottom or free end of the probe. It should also be recognized that such a geometry allows the probe in accordance with the present invention to be inserted into a trench-like structure having a width at the top or material surface equal to the separation of the CNT axes at the bottoms of the CNTs plus one CNT diameter and thus is applicable to all reasonably foreseeable minimum feature size regimes while the probe is in the same orientation used for operation and measurement. With a relatively minor and simple rotational manipulation, the probe in accordance with a preferred form of the present invention could be inserted into a trench-like structure only slightly larger than the 10 nm diameter of a CNT. Further, it should be appreciated that the probe in accordance with the present invention yields a probe with not only much greater length than the probes illustrated in FIGS. 1A-1C, but also of much greater aspect ratio which can be used to make measurements within much smaller features as well as being of increased strength and robustness.

It should also be appreciated that the same types of measurements in trench-like structures can also be achieved, albeit requiring much increased time, using a single, similarly angled CNT probe as will be described in greater detail below. For example, a recess on one side of the trench-like structure can be probed along the length of the trench-like structure and then the probe or the substrate can be turned through a suitable angle (e.g. 180°) and the process repeated along the other side or another surface (e.g. an end) of the trench-like structure. Similarly, two separately mounted, angled CNT probes (as will also be described in greater detail below) can be used together but manipulated relative to each other to adjust crossing point height and/or to facilitate insertion into a trench-like structure having a particularly narrow top opening but a potentially large recess.

Figure 4:
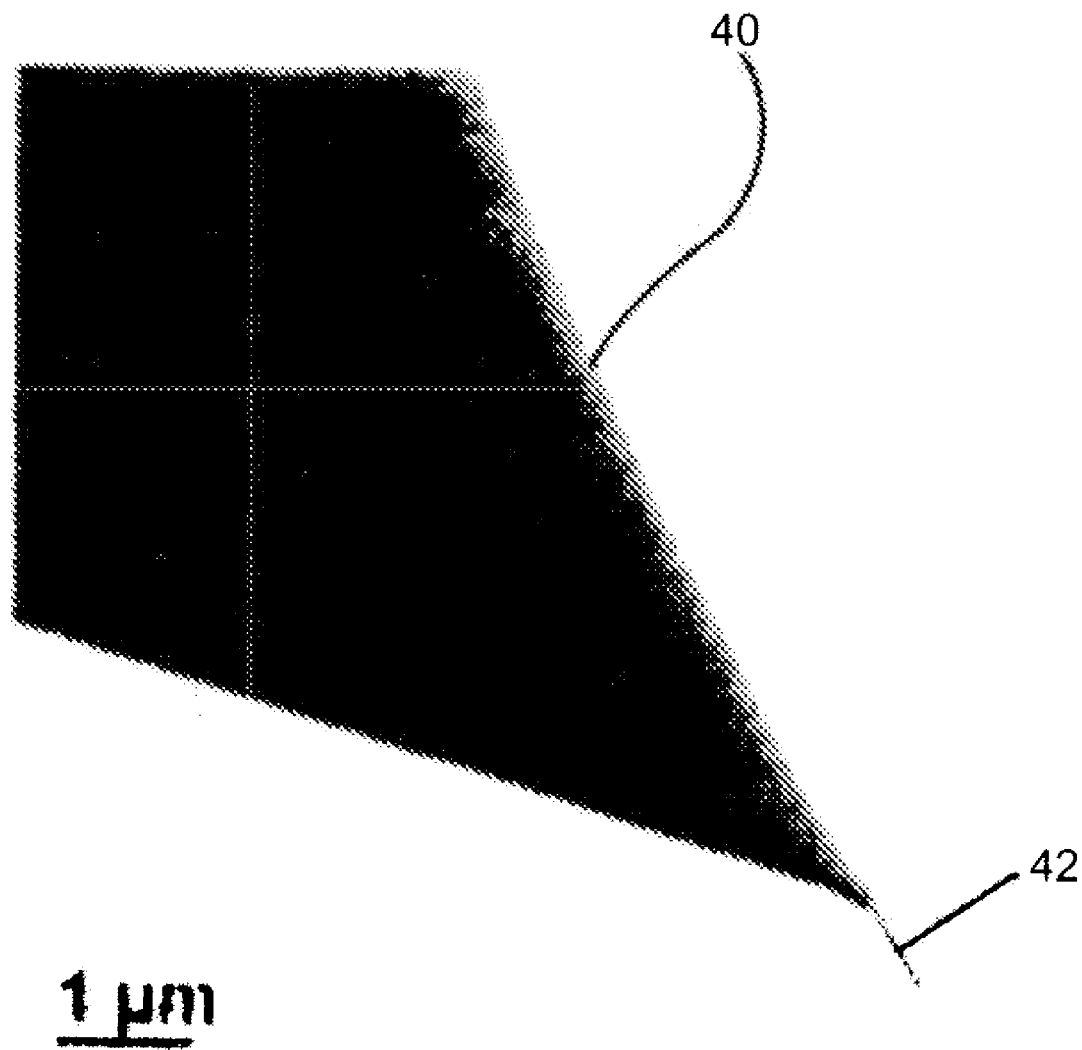
FIG. 4 is a photomicrograph of a carbon nanotube as grown from a base.
Figure 5:
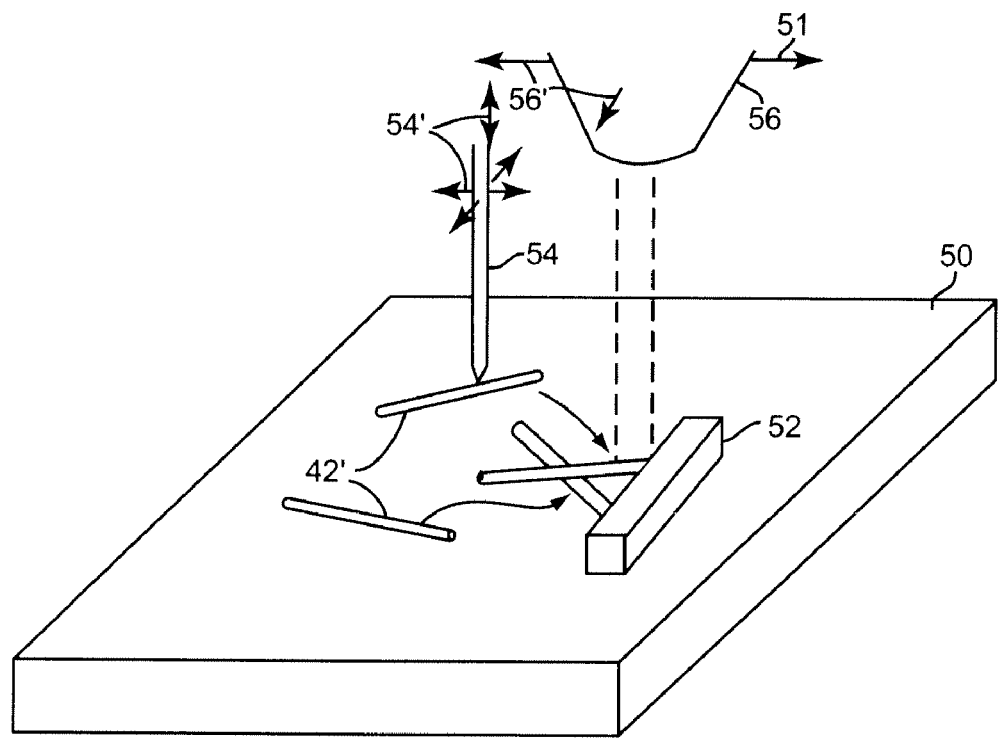
FIG. 5 illustrates a preferred technique of constructing a probe in accordance with the present invention.

Referring now to FIGS. 4 and 5, a preferred technique of construction of a probe tip in accordance with the present invention will now be explained. FIG. 4 shows a photomicrograph of a generally conical base structure 40, preferably of silicon (as discussed in the above-incorporated Martinez et al. article) from which a carbon nanotube 42 has been grown or to which the CNT 42 is attached. As illustrated, the carbon nanotube (CNT) 42 will extend from the tip of the base (sometimes referred to as an AFM tip) coaxially or at a slight angle determined by the crystal structure at the tip of base 40 or the attachment process, neither of which can be well-controlled at the present state of the art prior to the present invention. However, the angle of the nanotube 42 relative to the axis of the base 40 can be determined by inspection with a scanning electron microscope (SEM) or the like. Since the CNT is grown from the base or attached by welding (e.g. using the electron beam of the SEM as disclosed in the above-incorporated article) and is essentially crystalline in structure, the juncture of the CNT and the base/AFM tip is substantially as mechanically robust as the CNT, itself.

While the method of attachment of a CNT to an AFM tip is adequate for practice of the invention when the attachment process described in the above-incorporated Martinez et al. article produces probes where the angle of attachment of the CNT to the AFM tip, although not well-controlled, is determined, by inspection subsequent to CNT attachment to be adequate for measurement of a particular geometry of interest in a trench-like structure an attachment technique which will now be described with reference to FIG. 5 provides much improved control over attachment angle. Specifically, a separated CNT 42' (which may be either a single CNT or a dual concentric type of CNT which is significantly more robust) may be transferred to a preferably flat and horizontal surface 50 preferably located within a SEM or the like to permit observation. The CNT could be cut from a base/AFM tip in-situ using the SEM or the like to facilitate transport of the CNT to the surface. Once the CNT is on the surface, it can be readily manipulated in position using a known micro-probe 54 which can be translated in location as indicated by arrows 54' to bring the CNT 42' into contact with a base 52, preferably of metal or carbon at a desired angle. Once such a contact is achieved, the CNT 42' can be welded to base 52 using known focused ion beam (FIB) or electron beam welding techniques, either of which may include introduction of a gas for deposition of weld material such as metal and/or carbon. As is known, an ion beam or electron beam can be focused to a 5 nm or less spot at the present state of the art and thus the weld size can be kept comparable to the diameter of a CNT. This process can be repeated as desired to attach as many CNTs as may be desired for a given probe design. Optionally, when two or more nanotubes are welded to the probe base, it may be desirable for some applications to also weld some or all of the carbon nanotubes to each other at the crossing points which may cause probes in accordance with the invention to be more robust and may also improve the sensitivity with which AFM may be performed in some applications. Finally, the probe tip(s) formed by CNT(s) may be cut to a desired length by relocating the focused ion beam or electron beam a desired distance away from base 52 and introducing a gas suitable to cause etching of the CNT (e.g. gas assisted etching). Alternatively, such cutting can be performed using the electron beam of the SEM.

Referring now to FIGS. 6A-6D different types of probe arrangements suitable for practice of the invention for various applications will be discussed. These particular probe arrangements should be considered as exemplary and not exhaustive since many other suitable arrangements will be apparent to those skilled in the art in view of the following discussion.

Figure 6A:
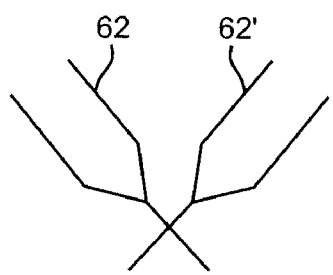
FIGS. 6A, 6B, and 6D illustrate preferred variant forms and implementation of the invention.
Figure 6B:
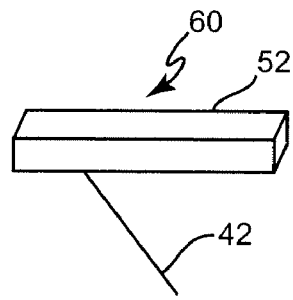
Figure 6C:
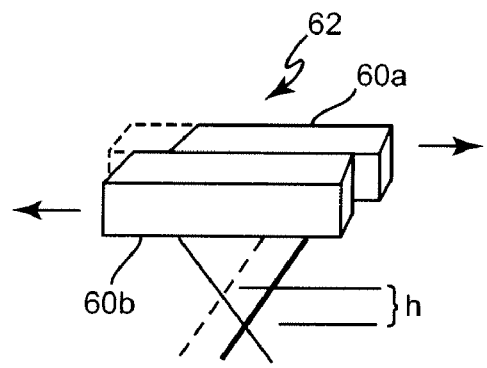
Figure 6D:
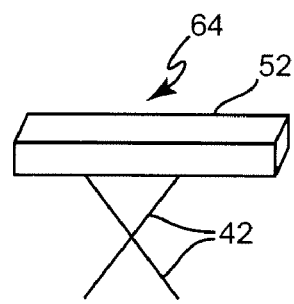

As shown in FIG. 6A, a single probe 62 or 62' or a pair of probes 62,62' prepared by attachment of a CNT to respective AFM tips is the manner described in the above-incorporated Martinez et al. article may be disposed at an angle in order to probe into recesses. As alluded to above, this probe arrangement and the use of a single such probe, in particular are not preferred since use of only a single probe extends (e.g. doubles) the time required for metrology of a trench-like structure. Further, the manipulation required for insertion of a probe into a trench-like structure would generally be separately required for each probe. Moreover, since the angle of the CFM relative to the AFM tip is not well-controlled, particular probe tips having suitable angles for the metrology of the geometry of interest must be chosen by inspection; consuming additional time in the metrology process. Accordingly, the probe configuration 60 shown FIG. 6B is much preferred over that illustrated in FIG. 6A since the process described above in connection with FIG. 5 can establish a desired angle for the CNT relative to base 52.

As a variant of the probe arrangement of FIG. 5B, two or more such arrangements 60a, 60b, can be employed together and oriented such that the respective CNTs are position at generally opposite angles (which need not be the same). This configuration 62, illustrated in FIG. 6C, allows probes 60a and 60b to be moved relative to each other as indicated by dashed lines and arrows which thus can adjust not only the separation of the CNT tips but the height of the crossing point, as well. Such a configuration can also facilitate introduction of the probes into structures that may have a small surface opening and large recesses. However, mechanisms allowing relative motion of the probes to be controlled are substantially comparable to a pair of micro-probe arrangements 54 alluded to above and thus would be of substantial cost and complexity of operation. Therefore, absent particular extreme geometries to be measured, configuration 64 having two CNTs 42 attached at opposing angles to a single probe base 52 remains preferred for general practice of the invention.

In view of the foregoing, it is seen that the invention, by providing at least two carbon nanotubes (sometimes referred to as nanofibers) at an angle to each other in a crossing arrangement while either touching or slightly separated from each other provides a probe which can support accurate metrology of recesses in trench-like structures including but not limited to semiconductor electronic devices, integrated circuits and nano-machines. The probe in accordance with the present invention can be fabricated in a simple and reliable manner and provides much improved measurement of critical dimensions within much smaller features than probes of the type illustrated in FIGS. 1A-1C since it uniquely allows the physical surfaces where critical dimensions are presented to be reliably reached.

While the invention has been described in terms of a single preferred embodiment, those skilled in the art will recognize that the invention can be practiced with modification within the spirit and scope of the appended claims. For example, more than two CNTs could be provided to monitor particular shapes in either two or three dimensions.

Having thus described my invention, what I claim as new and desire to secure by Letters Patent is as follows:

1. A probe for performing dimensional measurements within trench-like structures comprising
    a probe base, and
    at least one carbon nanotube having a length exceeding a depth of said trench-like structure and having one end attached to said probe base at an angle greater than an angle of a recess under an edge of a said trench-like structure in order to provide a free end of said at least one carbon nanotube to contact a surface of said recess within said trench-like structure.

2. A probe for performing dimensional measurements within trench-like structures comprising at least two carbon nanotubes arranged at opposite angles to each other with one carbon nanotube crossing another nanotube at an angle, each said carbon nanotube having a length exceeding a depth of said trench like structure arranged at an angle corresponding to an angle of a recess of a said trench-like structure in order to contact a surface of a recess within said trench-like structure.

3. The probe as recited in claim 2 wherein the carbon nanotubes are separated from each other by a distance.

4. The probe as recited in claim 3 wherein said distance is approximately the diameter of one said carbon nanotube.

5. The probe as recited in claim 2 wherein said one carbon nanotube is in contact with said another carbon nanotube.

6. The probe as recited in claim 2, wherein said crossing of said carbon nanotubes is located at a distance from an end of said carbon nanotubes which approximates a depth of a feature to be measured.

7. The probe as recited in claim 2, wherein a height of said crossing is adjustable.

8. The probe as recited in claim 2, wherein said angle is such that a carbon nanotube extends from said crossing for a lateral distance greater than a recess of a feature to be measured.

9. The probe as recited in claim 1 wherein said angle exceeds an angle of a crystal lattice of a material in which a feature to be measured is formed.

10. A method of performing measurements of a recess within trench-like structures with a probe comprising one or more carbon nanotubes, each carbon nanotube having a free end and an opposite end attached to a probe base at an angle corresponding to an angle of a recess of said trench-like structure, said method comprising steps of
    manipulating said probe into said trench-like structure such that said one or more carbon nanotubes enter said trench-like structure axially or such that a width of said probe in a direction transverse to said trench-like structure is maintained equal to or less than a width of an upper portion of said trench-like structure, and
    scanning said probe until a said free end of a carbon nanotube of said one or more carbon nanotubes contacts said recess within said trench-like structure.

11. The method as recited in claim 10 wherein said probe comprises at least two carbon nanotubes at an angle to each other with one carbon nanotube crossing another carbon nanotube at a distance from each other, wherein said scanning step further comprises scanning said probe to contact different sides of said trench-like structure.

12. The method as recited in claim 10 wherein said manipulating step includes a rotational motion.

13. The method as recited in claim 10 including further steps of
    propagating a vibration in said one carbon nanotube, and
    detecting a change in frequency of said vibration.

14. The method as recited in claim 10 wherein said scanning step includes motion of a probe in a plane parallel to a plane parallel to said one carbon nanotube and said another carbon nanotube.

* * * * *